US012623347B2

(12) United States Patent
Ferraguti et al.

(10) Patent No.: US 12,623,347 B2
(45) Date of Patent: May 12, 2026

(54) METHOD FOR THE SAFETY CONTROL, DURING DIRECT TEACHING, OF A ROBOTISED SYSTEM AND RELATIVE ROBOTISED SYSTEM

(71) Applicant: GAIOTTO AUTOMATION S.P.A., Imola (IT)

(72) Inventors: Federica Ferraguti, Piacenza (IT); Mattia Bertuletti, Piacenza (IT); Mattia Gambazza, Piacenza (IT); Matteo Ragaglia, Piacenza (IT); Cesare Fantuzzi, Piacenza (IT)

(73) Assignee: GAIOTTO AUTOMATION S.P.A., Imola (IT)

( * ) Notice: Subject to any disclaimer, the term of this patent is extended or adjusted under 35 U.S.C. 154(b) by 110 days.

(21) Appl. No.: 18/696,290

(22) PCT Filed: Sep. 29, 2022

(86) PCT No.: PCT/IB2022/059285
§ 371 (c)(1),
(2) Date: Mar. 27, 2024

(87) PCT Pub. No.: WO2023/053053
PCT Pub. Date: Apr. 6, 2023

(65) Prior Publication Data
US 2024/0399578 A1 Dec. 5, 2024

(30) Foreign Application Priority Data
Sep. 29, 2021 (IT) ........................ 102021000024905

(51) Int. Cl.
*B25J 9/16* (2006.01)
(52) U.S. Cl.
CPC ............. *B25J 9/1666* (2013.01); *B25J 9/163* (2013.01)

(58) Field of Classification Search
CPC ........ B25J 9/1666; B25J 9/163; B25J 9/1676; G05B 2219/39097; G05B 2219/40202
See application file for complete search history.

(56) References Cited

U.S. PATENT DOCUMENTS

| | | | | |
|---|---|---|---|---|
| 5,347,459 A | * | 9/1994 | Greenspan | ............... B25J 19/06 700/255 |
| 2003/0225479 A1 | | 12/2003 | Waled | |
| 2017/0285625 A1 | | 10/2017 | Sato et al. | |
| 2018/0210434 A1 | | 7/2018 | Iwatake | |
| 2018/0235565 A1 | | 8/2018 | Azizian et al. | |
| 2019/0061155 A1 | * | 2/2019 | Hashimoto | ............ B25J 9/1666 |

(Continued)

FOREIGN PATENT DOCUMENTS

| | | |
|---|---|---|
| EP | 1901150 A1 | 3/2008 |
| EP | 3446837 A1 | 2/2019 |

(Continued)

OTHER PUBLICATIONS

Office Action received for Japanese Patent Application No. 2024-519826, mailed on Mar. 4, 2025, 12 pages (6 pages of English Translation and 6 pages of Original Document).

(Continued)

*Primary Examiner* — Ryan Rink
(74) *Attorney, Agent, or Firm* — Workman Nydegger

(57) ABSTRACT

A method for the safety control, through direct teaching, of a robotised system comprises a learning step, wherein a processing unit determines a relative distance (RD) between at least one link (L) of the robot manipulator and an operator (O) and controls whether the relative distance (RD) of the at least one link (L) exceeds a predefined distance threshold value (TV); wherein the predefined distance threshold value (TV) is equal to or greater than the distance covered by the robot manipulator in the amount of time needed to stop starting from a respective maximum linear speed (VMAX); in case the relative distance (RD) is smaller than the predefined distance threshold value (TV), the method entails stopping the robot.

12 Claims, 6 Drawing Sheets

(56)          References Cited

U.S. PATENT DOCUMENTS

| | | | |
|---|---|---|---|
| 2019/0337156 A1 | 11/2019 | Kinugasa | |
| 2020/0030983 A1 | 1/2020 | Fantuzzi et al. | |
| 2020/0070347 A1 | 3/2020 | Denenberg et al. | |
| 2020/0368909 A1* | 11/2020 | Sejimo | B25J 9/1669 |
| 2021/0053226 A1 | 2/2021 | Mello et al. | |
| 2022/0288785 A1* | 9/2022 | Moriyama | B25J 9/1651 |
| 2022/0379478 A1* | 12/2022 | Raghunathan | B25J 9/163 |
| 2023/0191592 A1* | 6/2023 | Takahashi | B25J 9/1656 |
| | | | 700/257 |
| 2023/0202037 A1* | 6/2023 | Andreoni | B25J 9/1676 |
| | | | 700/245 |

FOREIGN PATENT DOCUMENTS

| | | | |
|---|---|---|---|
| JP | 2017-512078 A | 5/2017 | |
| JP | 2018-118340 A | 8/2018 | |
| JP | 2019-038065 A | 3/2019 | |
| JP | 2019-529149 A | 10/2019 | |
| JP | 2022-545468 A | 10/2022 | |
| WO | WO-2021041213 A1* | 3/2021 | F16P 3/142 |

OTHER PUBLICATIONS

International Search Report and Written Opinion received for PCT Patent Application PCT/IB2022/059285, mailed Jan. 26, 2023, 19 pages.

Sandor Szabo, et al. "A Testbed for Evaluation of Speed and Separation Monitoring in a Human Robot Collaborative Environment", National Institute of Standards and Technology, Mar. 1, 2012, Retrieved from the Internet: URL:https://ws680.nist.gov/publication/get_pdf.cfm?pub_id=910293 [retrieved on May 3, 2018].

* cited by examiner

FIG. 6

METHOD FOR THE SAFETY CONTROL, DURING DIRECT TEACHING, OF A ROBOTISED SYSTEM AND RELATIVE ROBOTISED SYSTEM

CROSS-REFERENCE TO RELATED APPLICATIONS

The present invention is a 35 U.S.C. § 371 U.S. National Stage of PCT Application No. PCT/IB2022/059285, filed on Sep. 29, 2022, which claims priority from Italian Patent Application No. 102021000024905 filed on Sep. 29, 2021. The entire content of each of the aforementioned patent applications is incorporated herein by reference.

FIELD OF THE ART

The present invention relates to a method for the safety control, during direct teaching, of a robotised system, in particular comprising a robot manipulator, and to a related robotised system.

The present invention finds advantageous, but not exclusive application in the field of ceramics, more particularly the glazing of ceramic articles, to which the following discussion will explicitly refer without losing its generality.

BACKGROUND OF THE INVENTION

In the field of processing ceramic articles, it is known to use robotised devices supporting spraying heads to paint and/or glaze surfaces.

This type of approach, also used in other areas such as welding, positioning, polishing etc. is highly versatile and effective and has led to an increase in production speed and improvements in the repeatability and precision of the industrial process.

In recent years, the use of industrial manipulators (hereafter also referred to simply as robots) has changed radically, moving from an idea of complete segregation of the workspace (obtained through physical barriers) to a scenario in which robots and human operators share the same workspace and also collaborate side by side. In this context, robots are becoming key elements in increasing the competitiveness of production, as the physical human-robot interaction (pHRI) can certainly help companies achieve a greater production flexibility to cope with rapidly evolving products. However, the widespread adoption of robotised technologies is still undermined by some well-known factors, including the inherently complex and time-consuming nature of robot programming.

In view of the fact that a same robot can paint and/or glaze articles of different shapes, the way in which it is "taught" how to act has become an increasingly important working step and should be as simple and intuitive as possible.

Traditional methods for programming industrial manipulators typically consist in using handhelds (teach pendants) for "point-to-point" programming (PTP) or in simulating the activity of the manipulator within an "offline" programming environment.

In the former case, not only does the operator have to learn to use the teach pendant properly, but the intrinsic point-to-point programming style of these apparatuses is only efficient for particularly simple movements. In particular, the robot itself must be used to program the robot (i.e. a production stop is generated) and the programming is rather complicated (it is necessary to move the robot, at so-called "collaborative" reduced speeds, at every point of the path and save its position); and in order to be able to evaluate the goodness of the result, the program must be completed and then executed; if the result is not satisfactory, these operations must be repeated.

In the second case ("off-line" programming), on the other hand, it is absolutely necessary to know the platform-specific programming language (and/or a dedicated programming environment, i.e. a dedicated IDE program), thus requiring specific and usually excessive knowledge from the human operator for the machine operator's task.

The "off-line" and "PTP" programming methods are complex and laborious and this makes them particularly inefficient for the production of small and medium-sized batches.

To overcome these shortcomings, direct teaching programming strategies generally defined as "walk-through" programming (also referred to as "lead-through" or "manual guidance" programming) have been developed, with the most diverse practical applications, such as spraying or welding. These programming strategies are characterized by the fact that the operator grasps the manipulator and manually leads it in the desired positions, without any prior knowledge of the specific programming language and/or of the functions offered by the specific handheld (teach pendant). During the learning step, a control unit (hereinafter also called a controller) of the robot records the intermediate points or the entire trajectory imposed by the human operator, so that the manipulator itself can subsequently reproduce this desired movement independently.

Generally, direct teaching programming architectures are based on two key elements: a detection system (sensor) and an admittance (or impedance) control algorithm managed by the control unit (or controller). The detection system is responsible for measuring the interaction forces/torques exerted by the operator on the manipulator.

The aforesaid objective can be achieved mainly in two ways: by exploiting the direct detection of the torque at the joints of the manipulator (which, however, is often not made available to the customer by the manipulator manufacturers or is influenced by a poor frequency and/or resolution of the data); or by mounting a special sensor (for example a dedicated load cell) on the end effector (i.e. the portion/element/end link, i.e. after the last joint) of the manipulator.

In both cases, direct teaching programming undoubtedly determines one of the clearest examples of pHRI, however, the high proximity between the human operator and the robot determines a whole series of safety problems impeding high-speed direct teaching programming. In some cases, when the manipulator manufacturers grant it, for direct teaching operations, an open control architecture tends to be preferred, especially when direct teaching is used to record continuous trajectories at high speed, interfacing directly with a low-level real-time control of the manipulator. However, this approach leads to further critical issues from a safety point of view.

In particular, for the aforesaid reasons, a Cartesian speed limit of 250 mm/s has been defined in the safety standards for the direct teaching of industrial manipulators. In addition, the maximum speed of each joint and its acceleration are usually also limited. Although these limitations may be appropriate for scenarios where only intermediate points need to be stored, the same may prevent the use of direct teaching programming when it is necessary to record continuous trajectories carried out at high speed. For example, the spraying robots cannot be manually guided at low Cartesian speeds, as their movement must be smooth and synchronised with the parameters of the spraying system, which in turn cannot (often comprising also on/off valves) be kinematically modulated with respect to time. The same observations can also be made about other types of application, such as welding, polishing, etc.

In general, an industrial manipulator is often a serial robot, i.e. a robot provided with a number (depending on the application and the degrees of freedom required) of rigid links connected to each other by joints. In particular, even in walk-through programming, safety issues are often dependent on the possibility of collision or entrapment of the operator with the rigid links that make up the robot.

To overcome these problems, some solutions have been proposed, comprising wearable haptic devices for direct teaching in teleoperation, considering it as a safer alternative to walk-through programming. However, the lack of direct interaction must be compensated by the addition of telepresence functions such as tactile feedback and a remote vision system, greatly increasing the costs for equipment, which are only justified in high-risk situations such as demolition of buildings, decommissioning of nuclear power plants, disaster recovery, etc.

Aim of the present invention is to provide a method to control, in particular during direct teaching, a closed robotised system, in particular an industrial manipulator and a relative processing plant, which allow to overcome, at least partially, the drawbacks of the known art and are, at the same time, easy and economical to realize.

SUMMARY

According to the present invention there are provided a method for the safety control, during direct teaching, of a robotised system, in particular comprising a robot manipulator, and a relative robotised system as claimed in the following independent Claims and, preferably, in any of the Claims directly or indirectly dependent on the independent Claims.

The Claims describe preferred embodiments of the present invention forming an integral part of the present disclosure.

In this text, "torque" means "moment of a force" (torque) or in any case another quantity containing the (more precisely, function of) moment of a force. "Moment of a force" (or "mechanical moment") has as its common meaning the attitude of a force to impart a rotation on a rigid body around a point (in the plane) or an axis (in the space) when this is not applied to its centre of mass.

In this text, "force" also means (in addition to the meaning normally given to this term) another quantity containing the (more precisely, function of) force. According to some embodiments, "force" means force according to its normal meaning.

BRIEF DESCRIPTION OF THE DRAWINGS

The invention will now be described with reference to the accompanying drawings, which show some non-limiting examples of embodiments, wherein:

FIG. 6 schematically shows a geometric representation of relative speeds between a portion of the robotised system of FIG. 5 and an operator.

DETAILED DESCRIPTION

Figure 1:
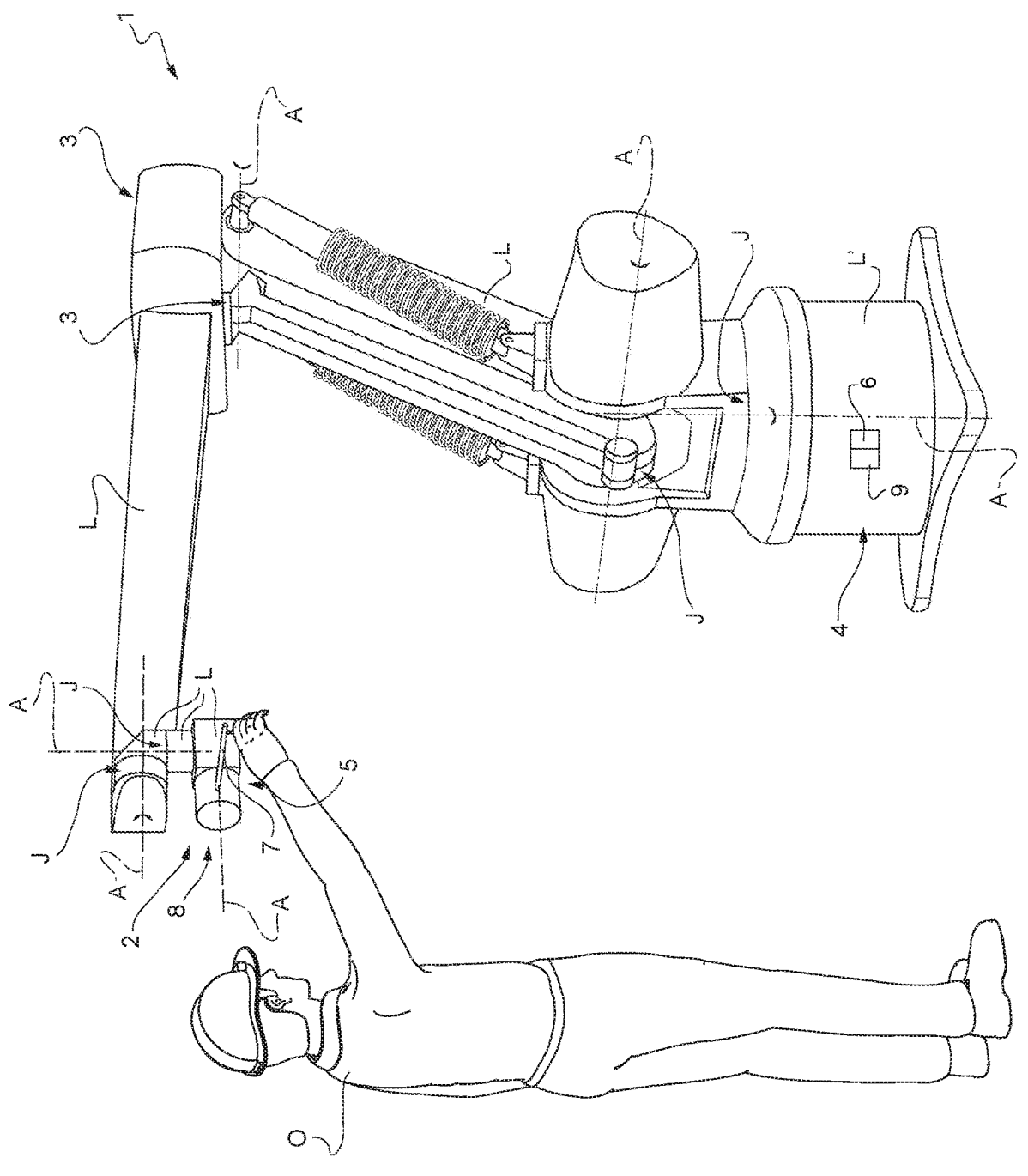
FIG. 1 is a perspective view with details removed for clarity's sake of a robotised system in accordance with the present invention.

In accordance with a first aspect of the present invention, in FIG. 1, 1 denotes as a whole a robotised system, in particular, but not limited to, for the treatment of an article (in itself known and not shown, for example a sanitary ware).

The robotised system 1 comprises an end effector 2 which is configured to process or interact with an article being produced (for example the article).

Figures 2, 3:
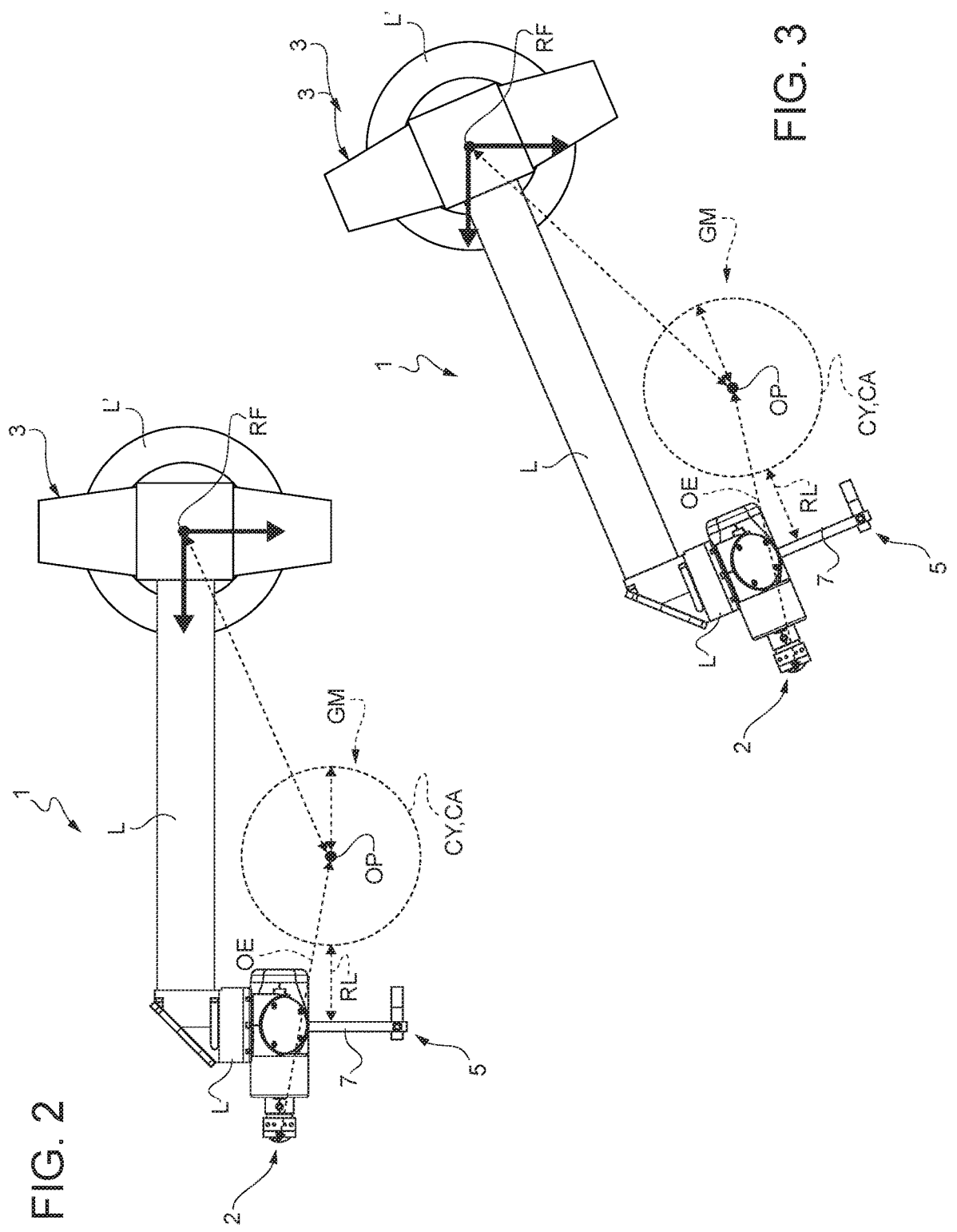
FIGS. 2 and 3 are two schematic top views of the apparatus 1 in two different operational configurations.

In the non-limiting embodiment of FIGS. 1 and 2, the end effector 2 is a spraying head, which is configured to emit a jet of a substance to cover at least part of the surface of the (in particular ceramic) article. In other non-limiting and non-illustrative embodiments, the end effector 2 is a welding head, a gripping head, a gripper, or any other machining tool.

Advantageously, the robotised system 1 comprises a robot manipulator 3, which is movable with at least three (in particular at least four, more in particular six) degrees of freedom and on which the end 2 (for example the spraying head) is mounted.

In particular, the robot manipulator 3 comprises a plurality of motorized joints J connected one another in succession by means of mechanical (substantially rigid) L (links). Preferably, the joints J are rotary joints of a known type and therefore not more detailed. Each link L is rotatable with respect to the previous one around a respective axis A of rotation. The rotation around each of the axes A represents a degree of freedom of the robot manipulator 3. In the embodiment shown, the robot manipulator 3 has six degrees of freedom and, more precisely, has six axes A of rotation. The robotised system 1 also comprises a control system 4 and a driving assembly 5.

The control system 4 comprises a storage unit 6 and is configured to control the movement of the robot manipulator 3 so as to move the end effector 2 (i.e. the spraying head). In particular, the control system 4 is also designed to adjust the operation of a tool mounted on board the end effector 2 (for example a spraying head, a welding head, etc.).

Preferably, the driving assembly 5 is configured to be operated by an operator O to so as transfer indications of movement to the robot manipulator 3. In particular, the driving assembly 5 is also configured to transfer operation indications to the end 2 (e.g., the spraying head).

The robot manipulator 3 is typically an anthropomorphic industrial type robot and can for example be the GA-OL robot by Gaiotto Automation SpA. The robot manipulator 3 may also have more than six degrees of freedom (in particular, more than six axis A of rotation). In some non-limiting cases, the degrees of freedom may be five axes of rotation and one translation (e.g. horizontal or vertical).

In the non-limiting embodiment of FIGS. 1 and 2, the driving assembly 5 comprises a handling device 7, on which, in use, the operator O exerts a force and a torque (also called contact force). Furthermore, the driving assembly 5 comprises a sensor 8, which is connected to the end effector 2 and is designed to detect the force and torque applied to the handling device 7. In addition, the driving assembly 5 comprises a processing unit 9, which is designed to provide indications of movement for the robot manipulator 3 depending on the data detected by the sensor 8 (more precisely depending on the force and torque detected) and following an admittance (or impedance) control.

In particular, the sensor 8 has (at least) six degrees of freedom and is capable of measuring (at least) three forces and three torques (in a Cartesian reference system). The sensor 8 may be any known device capable of performing the functions described above.

According to specific non-limiting embodiments, the sensor 8 is, for example, the FTSens which, having measured three forces and three torques, is able to transmit them digitally over a CAN network. FTSens was developed by the IIT (Italian Institute of Technology) in Genoa. In this case, the measurements are detected thanks to a strain gauge technology, based on the deformation of strain gauges (of the electrical/resistance type) placed inside the body of the sensor.

According to other specific non-limiting embodiments, the sensor 10 is, for example, the FT Axia sensor 80, developed by ATI Automation; which performs data exchange via EtherCAT® protocol.

The storage unit 6 is designed to store the movements made by the robot manipulator 3 while the end effector 2 is moved by the operator O by means of the driving assembly 5. The control system 4 is designed to control the movement of the robot manipulator 3 depending on the movements stored by the storage unit. In particular, the control system 4 is designed to control the movement of the robot manipulator 3 so that the robot manipulator 3 substantially (in particular exactly) repeats the movements stored by the storage unit 6, more particularly so that the end effector 2 substantially (in particular exactly) repeats the movements made while the operator O moves the end effector 2.

In particular, "movement" or "movements" means in this text a path and speed along the path. More precisely, the movement of the robot manipulator 3 is the movement in the space of each movable part of the robot manipulator 5 in the space.

In particular, the handling device 7 is mounted on the robot 3 (more particularly, on the sensor 8). Advantageously but not necessarily, the handling device 7 is mounted on the robot manipulator 3 (i.e. on board) the end effector 2, in particular at an end of the robot 3. More precisely, the handling device 7 is connected to the robot 3 manipulator 5 through the sensor 8 (which supports the handling device 7).

In particular, the driving assembly 5 is of the type described within the Italian patent application 102016000097482 filed by the Applicant.

Advantageously, the robotised system 1 is configured to carry out the method described below.

In accordance with a second aspect of the present invention there is provided a method for the safety control, through direct teaching, of a robotised system, which performs the same functions and comprises the same components of the robotised system 1 described in the context of the first aspect of the present invention. More precisely, the robotised system 1 is like the one described in accordance with the first aspect of the present invention.

The method comprises a learning step, during which the operator O moves the end effector 2 of the robot manipulator 3 by means of the driving assembly 5 comprising the force/torque sensor 8 and the movements made by the end effector 2 are stored in the storage unit 6.

Preferably, the method further comprises a reproduction step, which takes place after the learning step and during which the control system 4 operates the robot manipulator 3 so that the end effector 2 substantially repeats (in particular exactly) the movements stored in the storage unit 6 (in particular, made during the learning step). In particular, during the learning step, the operator O grasps the handling device 7.

In particular, not necessarily, during the learning step, the operator exerts (applies) a force and a torque upon the handling device 7, which are detected by the sensor 8. More particularly, the processing unit 9 carries out an admittance control by obtaining, depending on the data detected by the sensor 8, indications of movement for the robot manipulator 3 in the space.

Advantageously, during the learning step, the processing unit 9 determines a current relative distance RD between at least one link L of the robot manipulator 3 and the operator O; and controls (verifies) that the relative distance RD of the at least one link L is greater than a predefined distance threshold value TV. In case the current value RD and/or VR is lower than the predefined value TV, the method entails stopping the robot manipulator 3, i.e. the unit 9 controls the robot manipulator 3 so as to stop it.

Advantageously, the predefined threshold distance value TV is equal to or greater than the distance that the robot manipulator 3 can cover in the amount of time needed to stop starting from a respective maximum linear speed. In other words, having estimated the distance that the robot manipulator 3 travels from the transmission of a stop signal received during a movement at the maximum speed $V_{MAX}$, the threshold distance value TV will be at least equal to the estimated distance. In this way, it is possible to have a reasonable certainty of the safety of the operator O, with whom, in the most extreme case, the robot manipulator 3 will come into contact at almost no speed.

Preferably, the processing unit 9 determines the relative distance RD between each link L and the operator O. In other words, the processing unit 9 cyclically evaluates, during the learning step, the distance between each link L and the operator O; in particular the distance between a point of each link and the operator O.

Advantageously but not limited to, alternatively or in addition to the position control, during the learning step, the processing unit 9 determines a current relative speed VR between at least one link L of the robot manipulator 3 and the operator O; and controls (verifies) whether said relative speed VR of the at least one link L is lower than a predefined threshold speed value TV'. In case the current value VR is higher than the predefined value TV', the method entails stopping the robot manipulator 3, i.e. the unit 9 controls the robot manipulator 3 so as to stop it. Preferably, the processing unit 9 determines the relative speed VR between each link L and the operator O.

Advantageously but not necessarily, the predefined threshold speed value TV' is substantially equal to the maximum linear maximum speed $V_{MAX}$ of the respective link L. In particular, the predefined threshold speed value TV' is variable depending on the application; for example, in the case of spraying, the predefined threshold speed value TV' is 1,500 mm/s.

Preferably but not in a limiting way, the threshold distance value TV is variable depending on the relative speed VR. In fact, even if the robot manipulator 3 moves at high speeds, if the operator O moves in the same direction, the relative speed VR would be lower and that the robot manipulator 3 hits the operator O would require a reversal of the robot manipulator 3 (which requires more time and therefore allows to stop the robot manipulator 3 before it can harm the operator O).

In some preferred but not limiting cases, the processing unit 9 is configured to monitor in real time the relative distance RD and the relative speed VR of the robot manipulator 3 (i.e. of each of its links L) with respect to the operator O. In this way, the control system 4 can identify situations characterized by a high risk of impact/entrapment and consequently emit an emergency stop signal.

Figure 4:
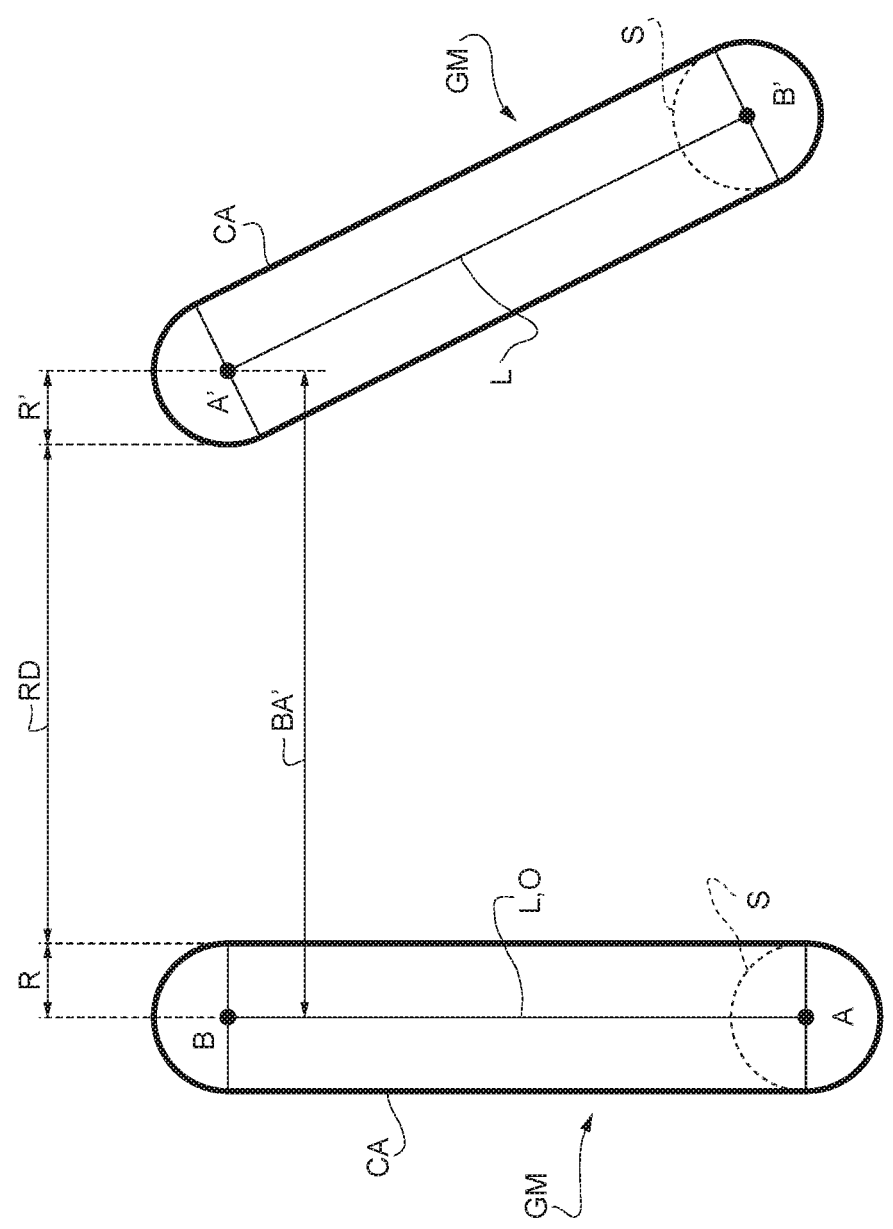
FIG. 4 is a schematic diagram showing a possible modelling of two portions (rigid links) of a robotised system or an operator in accordance with the present invention; in particular, FIG. 4 indicates in a non-limiting way a schematisation of the calculation of the minimum distance between the two rigid link portions schematised and modelled.

According to some preferred but not limiting embodiments, such as that shown in FIG. 4, each link L comprises a first and a second end A and B.

Figure 6:
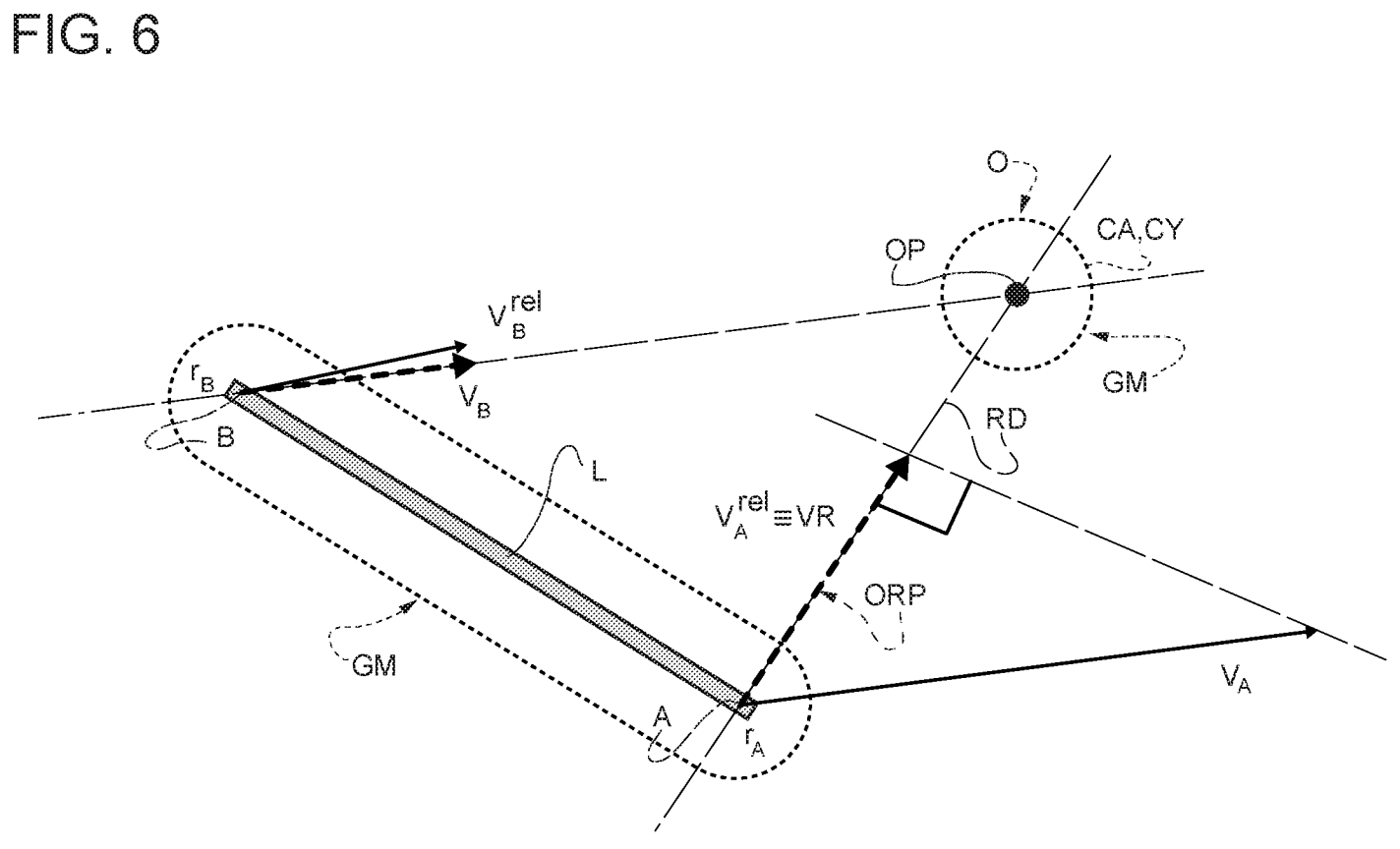

In particular, as schematically shown in the non-limiting embodiment of FIG. 6, the relative speed VR between the at least one link L and the operator O is defined as the greatest of the relative speeds $$V_A^{rel}, V_B^{rel}$$

calculated respectively between the operator O and the ends A and B of the link L.

In accordance with the non-limiting embodiment of FIGS. 2 and 3, the processing unit 9 determines the position of the operator O based on a rigid link RL between the operator O and the end effector 2 of the robot manipulator 3, in particular between the operator O and the driving assembly 5, more particularly based on the geometry of the driving assembly 5 that allows the operator O to move the robot manipulator 3. In other words, the position OP of the operator O is considered integral with the handling device 7 and therefore, preferably, the position OP of the operator O is considered at a fixed distance and integral, during the learning movement, with the end effector 2 of the robot manipulator 3.

Figure 5:
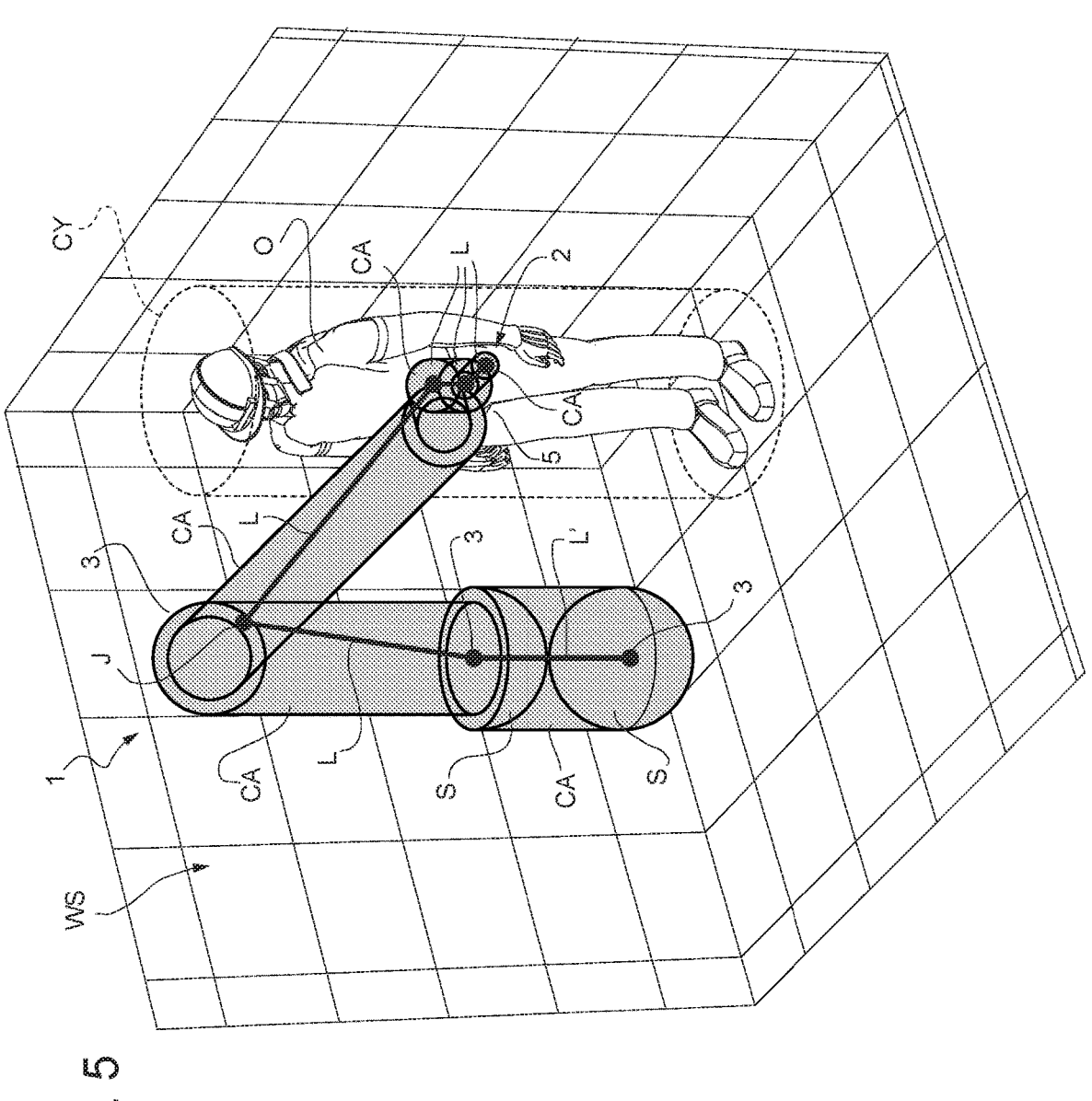
FIG. 5 schematically shows a perspective view of a three-dimensional modelling of the system of FIG. 1.

Advantageously but not necessarily, as shown in the non-limiting embodiments of FIGS. 4 and 5, in order to determine the position of the operator O and of the at least one link L (and their distance, or the distance between two different links L) capsule CA and/or cylinders CY geometric models GM are used.

In particular, as can be seen from the image shown in FIG. 5, in which the robotised system 1 is shown in its (simulated) working space WS, each capsule CA is defined by a convex casing obtained by translating a respective ball S (of which only some are indicated, for simplicity's sake) between the first and second end A and B of the respective link L or of the operator O. Alternatively, a capsule CA is defined by a cylinder CY at the ends of which there are caps or hemispheres having the base coinciding with a base of the cylinder CY.

In detail, each capsule CA and/or each cylinder CY are characterized by a respective radius R, R' (also known as "clearance").

Preferably, the method envisages modelling each link L with a respective capsule CA. In particular, the method envisages modelling the operator O with a single capsule CA.

In the non-limiting embodiment of FIGS. 2 and 3, the position OP of the capsule CA of the operator O is graphically represented relative to an inertial reference system RF and relative to the end effector 2 of the robot 3. In particular, in both FIGS. 2 and 3, the relative position (i.e. the distances RL and OE) of the capsule CA of the operator O both with respect to the handling device 7 and with respect to the end effector 2 remains constant, differently from the position OP of the capsule CA of the operator O relative to the inertial reference system RF (between FIG. 2 and FIG. 3 the angle changes in particular since only one base link L' has been moved, however, by moving other links L, the module of the position vector OP would also change).

In particular, the distance between two geometric model GMs (i.e. two capsule CA, two cylinder CY or one capsule CA and one cylinder CY) is calculated by subtracting the radii R, R' of each respective ball S (or cylinder CY) from the minimum of the distance between the respective ends A and B. In other words, in the non-limiting embodiment of the Figure, the distance between two geometric models GM (therefore between the operator O and a link L or between two links L) is equal to the value of the smallest of the distances AB' and BA' (in this case BA'), from which the radii R and R' are subtracted, i.e. RD=min (AB',BA')-R-R' (for example, in the non-limiting embodiment of FIG. 4 there is RD=BA-R-R'). Preferably but not necessarily, and as shown in the non-limiting embodiment of FIG. 6, the relative speed VR between a link L and the operator O is defined as the maximum relative speed $$V_A^{rel}, V_B^{rel}$$

between the capsule CA of the operator O and the ends A and B of the link L (which, preferably, correspond respectively to the centre of the ball S in points A and B).

In particular, in FIG. 6, the bar $r_A$-$r_B$ represents any of the links L of the robot manipulator 3. By means of kinematic calculations known per se and therefore not more detailed, the processing unit 9 calculates the linear speeds $V_A$ and $V_B$ of the points A and B (in particular depending on the angles of the joints J and their respective speeds). By projecting the resulting speed $V_A$, $V_B$ along the direction connecting the point $r_A$, $r_B$ to the position OP of the operator O (i.e. to the axis of the capsule CA of the operator), the relative speed $$V_A^{rel}, V_B^{rel} r$$

of that specific point A, B with respect to the operator O is calculated. In particular, the result of this orthogonal projection $ORP_A$, $ORP_B$ is a speed value $$V_A^{rel}, V_B^{rel}$$

with a sign, positive if the end A, B of the link is approaching the operator O and negative when it moves away from the operator O (obviously the signs can be reversed by convention).

In such non-limiting embodiments, the linear speed of the link L varies linearly between the ends A and B. Accordingly, the end A (point $r_A$) or the end B (point $r_B$) is necessarily the point of the link L having the maximum linear speed. Since the projection $ORP_A$, $ORP_B$ orthogonal to the capsule CA of the operator O consists of a linear combination of the coordinates of the linear speed $V_A$, $V_B$, it can again be stated that either the point $r_A$ or $r_B$ is necessarily the point of the link L characterized by the maximum relative speed $$V_A^{rel}, V_B^{rel}$$

with respect to the operator O. In this way, the control of the intermediate points between the two ends A and B can be avoided.

In some preferred non-limiting cases, the operator O, unlike the robot manipulator 3, is modelled by means of a single geometric model GM, in particular with capsule CA, which is considered as rigidly connected to the end effector 2 of the robot manipulator 3 depending on the geometry of the driving assembly 5 that allows the operator O to move the robot manipulator 3.

Advantageously but not necessarily, and as shown in the non-limiting embodiment of FIGS. 2 and 3, the operator's position OP is determined relative to an inertial reference system RF, preferably anchored to a base link L' of the robot manipulator 3.

Advantageously but not necessarily, the method provides for calculating the relative maximum speed based on the distal ends B of the links L only. In particular, since the capsule CA of the robot are arranged in sequence so that the end B of the i-th capsule corresponds to the end A of the (i+1)-th capsule, the method therefore provides, since the base link L' of the robot manipulator 3 (which typically corresponds to the point A of the first capsule CA of the robot 3) is normally stationary (for this reason it has been selected to anchor the reference system RF), the maximum relative speed $$V_A^{rel}, V_B^{rel}$$

(which in the case of FIG. 6 is the speed $$V_A^{rel})$$

is obtained by projecting exclusively the linear speeds $V_B$ of all and only the points B of the capsules CA of the robot manipulator 3. In other words, given the sequentially of the links L (i.e. that the end A of the i+1-th link L corresponds to the end B of the i-th link) and the fixed position of the end A of the base link L', by projecting the linear speeds $V_B$ of the only points B on the relative distances $r_B$-OP, one has all the speeds necessary to calculate the maximum relative speed and possibly emit the stop signal of the robot manipulator 3.

Advantageously but not necessarily, the method provides for converting the steps described so far into virtual safety variables, to be sent to a closed safety controller (i.e. not freely programmable). These controllers are typical of modern robot manipulators 3 and severely limit the functionality of the same to preserve the safety of operators and plants.

Preferably but not in a limiting way, the control method so far described is carried out by means of code allocated within a functional logic of the robotised system 1 (i.e. outside the safety controller mentioned above).

Figure 7:
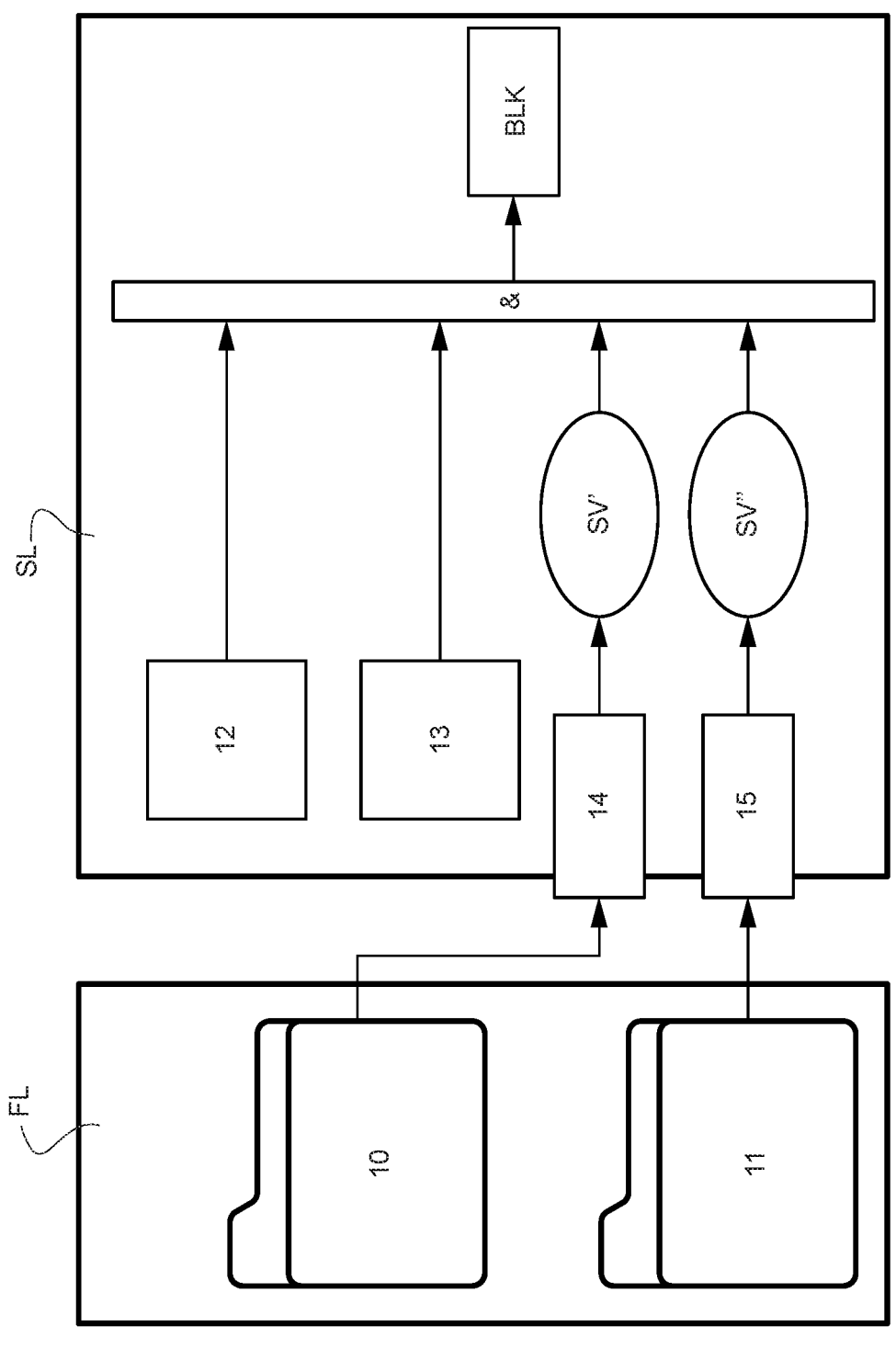
FIG. 7 schematically shows a possible block diagram of a safety control method in accordance with the present invention.

In the non-limiting embodiment of FIG. 7, the two macroblocks FL and SL schematically represent the functional logic LF and the safety logic LS of the robotised system 1 during the direct teaching step. In particular, the block 10 represents the dynamic monitoring (in real time) of the areas (of the respective geometric model GM, for example the capsule CA), collisions, positions and relative speeds in accordance with what has been described so far. More particularly, the block 11 represents an acceleration control, which uses experimental data to define respective acceleration limits in the space of the joints J and in the Cartesian space for the end effector 2 (with particular reference to the TCP—Tool Center Point—of the robot manipulator 3). Preferably, the block 10 and/or 11 is in action only if the learning step is activated.

Through the blocks 14 and 15, the aforesaid controls of the blocks 10 and 11 are converted into safety variables SV', SV" (preferably boolean variables normally true or equal to one). In detail, the block 14 and the block 15 transmit a "false" (or zero) value to the respective safety variable SV', SV" in case there are risks to the safety of the operator O, in other words in case the relative distance RD is lower than the threshold distance value TV, or in the case that the relative speed VR is higher than the threshold speed value TV', or even in the case that the Cartesian acceleration of the end effector 2 or of a joint J exceeds a respective reference value monitored by the control of the block 11.

Advantageously but not necessarily, the blocks 12 and 13 are blocks generally present within the closed safety controllers. In particular, the block 12 represents a known block by which to set a speed limit in the Cartesian space for the end effector 2 (integral with the TCP), for example, the block 12 is a SLSc (Safe Cartesian Speed Limit) block calibrated to the preset Cartesian speed limit and enabled only in the learning step.

Advantageously, but not necessarily, the method provides for calculating the maximum rotation speeds of the joints J (i.e. of their respective motorisations) corresponding to the previously set limit. In particular, such maximum speeds of rotation of the joints are calculated one joint J at a time, assuming that the remaining joints do not move. More particularly, the block 13 represents a known block comprising in its inside, for example, Safe Limited Speed Control (SLS) blocks calibrated on the previously identified values and enabled only in the learning step. Preferably, the block 13 comprises three SLS blocks for the first three joints starting from the base link L' (in other words for all joints J excluding those of the robot wrist 3).

The safety variables SV', SV" and those in output from the blocks 12 and 13 are cyclically verified by the safety logic LS using a block and equivalent to the logic condition AND. In case one of the values in input to this block has a different value from the others, the safety logic LS activates the block BLK, which immediately transmits an emergency signal that stops the robot in the shortest possible time (for example through the well-known STO—Safe Torque Off mechanism typical of brushless motors).

In use, during the execution of the learning step, the control system 4 (in the portion dedicated to safety) updates in real time the position of the capsule CA of the links L and of the operator O, calculates the relative distance RD between each capsule CA and that of the operator O (as shown in FIG. 4), and verifies that the minimum relative distance RD remains above the threshold distance value TV. By setting the value TV at the distance that the robot can cover at the maximum allowable linear speed during the time needed to impose an emergency stop, the (safety)

control system 4 can ensure that the risk of collision between the robot and the operator O is sufficiently low even at high speeds.

Although the above-described invention makes particular reference to a very precise example of implementation, it is not limited to that example of implementation, since all those variations, modifications or simplifications covered by the appended Claims, such as a different geometry of the robot manipulator 5, a different type of end effector, a different subdivision of the steps of the method, etc., fall within its scope.

The robotised system and the method described above have numerous advantages.

Firstly, this architecture allows the operator O to record trajectories made at high speed both in the Cartesian space and in the space of the joints, while maintaining a high safety standard absent according to the known art solutions and therefore binding for the direct teaching at high-speed.

Furthermore, in this way, the risk of mechanical collision between the robot and the operator is greatly reduced, while avoiding that some parts of the body of the latter are subject to entrapment or strangulation.

In addition, this makes it possible to help companies achieve greater production flexibility to cope with rapidly evolving products.

We claim:

1. A method for the safety control, during direct teaching, of a robotised system, the method comprising:
a learning step, during which an operator (O) moves an end effector of a robot manipulator of the robotised system by means of a driving assembly and the movements made by the end effector are stored in a storage unit of the robotised system;
wherein the robot manipulator comprises a plurality of links connected to one another through joints (J);
wherein:
during the learning step, a processing unit determines a relative distance (RD) between each link (L) of the robot manipulator and the operator (O) and controls whether the relative distance (RD) of the link (L) exceeds a predefined distance threshold value (TV);
the predefined distance threshold value (TV) is equal to or greater than the distance covered by the robot manipulator in the amount of time needed to stop starting from a respective maximum linear speed ($V_{MAX}$);
in case the relative distance (RD) is smaller than the predefined distance threshold value (TV), the method entails stopping the robot.

2. The method according to claim 1, wherein:
the processing unit determines a relative speed (VR) between at least one link (L) of the robot manipulator and the operator (O), and controls that said relative speed (VR) is lower than a predefined threshold speed value (TV');
in particular, the processing unit determines the relative speed (VR) between each link (L) of the robot and the operator (O); and
in case the relative speed (VR) exceeds the predefined threshold speed value (TV'), the method entails stopping the robot manipulator.

3. The method according to claim 2, wherein the predefined threshold speed value (TV') is substantially equal to the maximum linear speed of the respective link (L).

4. The method according to claim 2, wherein:
each link (L) comprises a first and a second end; and
the relative speed (VR) between said at least one link (L) and the operator (O) is defined as the greatest of the relative speeds calculated between the operator (O) and the first or the second end of the link (L).

5. The method according to claim 1, wherein:
the processing unit determines the position of the operator (O) based on a rigid link (L) between the operator (O) and the end effector of the robot manipulator,
in particular between the operator (O) and the driving assembly, in particular based on the geometry of the driving assembly, which allows the operator (O) to move the robot manipulator.

6. The method according to claim 1, wherein:
in order to determine the position of the operator (O) and of the at least one link (L), capsule and/or cylinder geometric models (GM) are used;
in particular, each capsule (CA) is defined by a convex casing obtained by translating a respective ball between a first and a second end of a respective link (L) or of the operator (O).

7. The method according to claim 6, wherein the distance between two geometric models (GM) is calculated by subtracting the radii of each respective ball from the minimum of the distance between the respective first and second ends.

8. The method according to claim 6, wherein the operator (O) is modelled by means of one single geometric model (GM), in particular a capsule model (CA), which is considered as rigidly connected to the end effector of the robot manipulator based on the geometry of the driving assembly, which allows the operator (O) to move the robot manipulator.

9. The method according to claim 1, wherein the position of the operator (O) is determined relative to an inertial reference system, that is anchored to a base link (L) of the robot manipulator.

10. The method according to claim 1, wherein the driving assembly comprises a force/torque sensor; wherein the operator (O), during the learning step, exerts a force and/or torque upon the driving assembly, whose sensor detects an applied force and/or torque.

11. A robotised system comprising:
an end effector, which is configured to process or interact with an article being produced;
a robot manipulator, which is movable with at least three degrees of freedom and on which the end effector is mounted; the robot manipulator comprising a plurality of joints (J) connected to one another through links;
a control system, which comprises a storage unit and is configured to control the movement of the robot manipulator so as to move the end effector in the space;
a driving assembly, which is configured to be operated by an operator (O) so as to transfer indications of movement to the robot manipulator;
the driving assembly comprises a handling device, upon which, in use, the operator (O) exerts a force and torque; a sensor, which is designed to detect a force and torque applied to the handling device; and a processing unit, which is designed to provide Cartesian movement indications for the robot manipulator depending on the data detected by the sensor and following an admittance control;
the storage unit is designed to store the movements made by the robot manipulator while the end effector is moved by the operator (O) by means of the driving assembly; the control system is designed to control the movement of the end effector based on the movements stored by the storage unit;

the robotised system being configured so as to carry out the method according to claim 1.

12. The robotised system according to claim 11 and comprising a spraying head, which is configured to emit a jet of a substance to cover at least part of the surface of a ceramic article.

\*   \*   \*   \*   \*